Nov. 13, 1928.

A. Y. DODGE

BRAKE

Filed March 10, 1924    2 Sheets-Sheet 1

1,691,566

Inventor:
A. Y. Dodge
By Jones, Addington, Ames & Seibold
Attys.

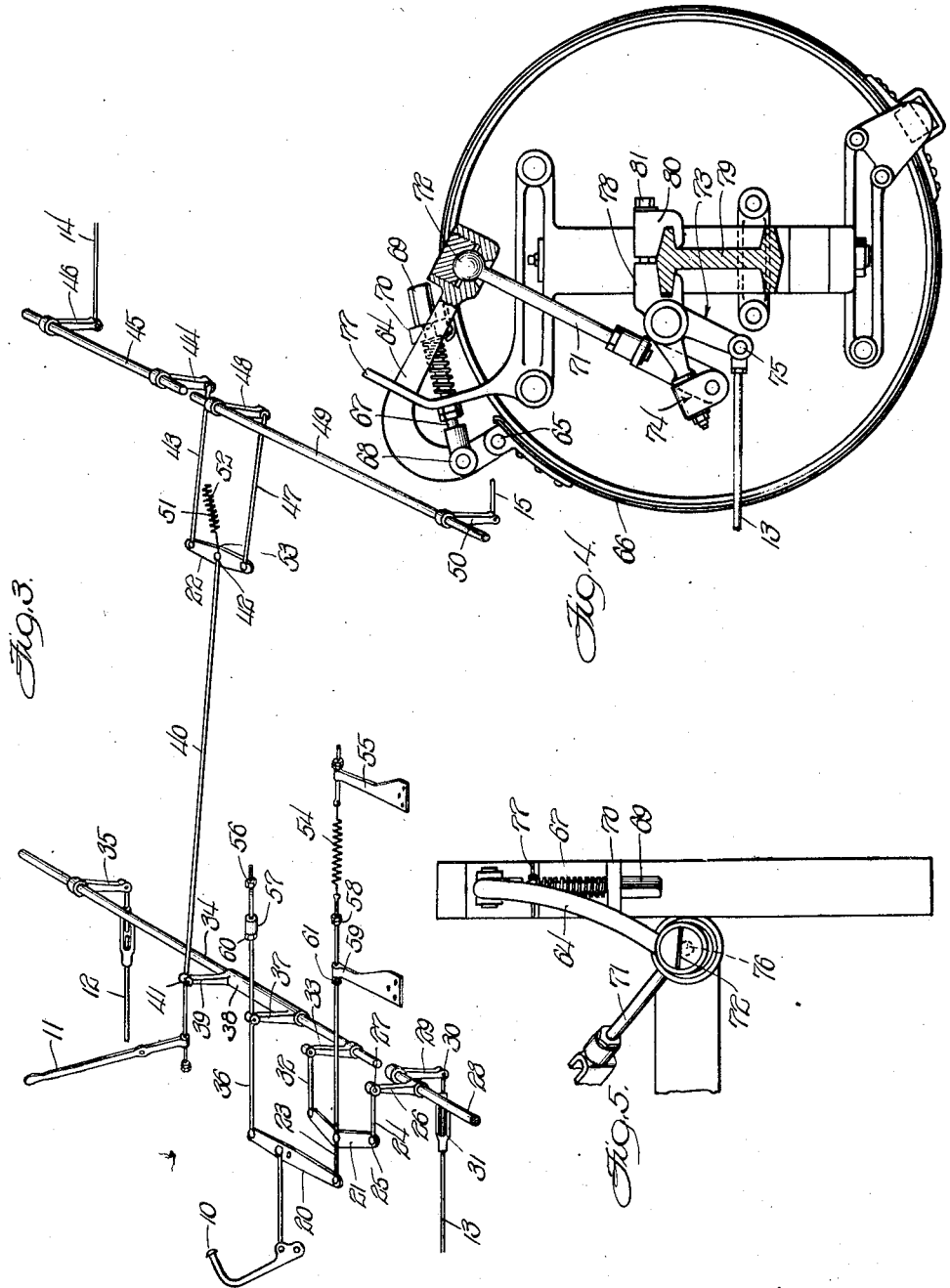

Patented Nov. 13, 1928.

1,691,566

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed March 10, 1924. Serial No. 697,981.

My invention relates to brake construction.

One of the objects of my invention is to provide a brake construction for all four wheels of an automobile so designed that there will be an equalizing effect and so that failure of the brakes at one end of the automobile will not cause failure of the brakes at the other end.

A further object of my invention is to provide a brake construction for all four wheels of an automobile actuated by a single pedal and having means whereby the brakes at one end are applied with more force than the brakes at the other end.

A further object of my invention is to provide an improved brake construction for all four wheels of an automobile in which the brakes at one end of the automobile are applied in advance of the brakes at the other end.

A further object of my invention is to provide an improved brake construction for the front wheels of an automobile in which the braking effect on the outside wheel is relieved in making a turn.

Further objects will appear from the description and claims.

In drawings, in which an embodiment of my invention is shown—

Fig. 3 is a diagrammatic perspective view showing the brake connections;

Fig. 4 is a side elevation of an external band brake;

Fig. 5 is a plan view of the brake construction shown in Fig. 4; and

The connections from the manually operated parts to the four brakes will be described before going into a detailed description of the brakes themselves.

Figure 1:
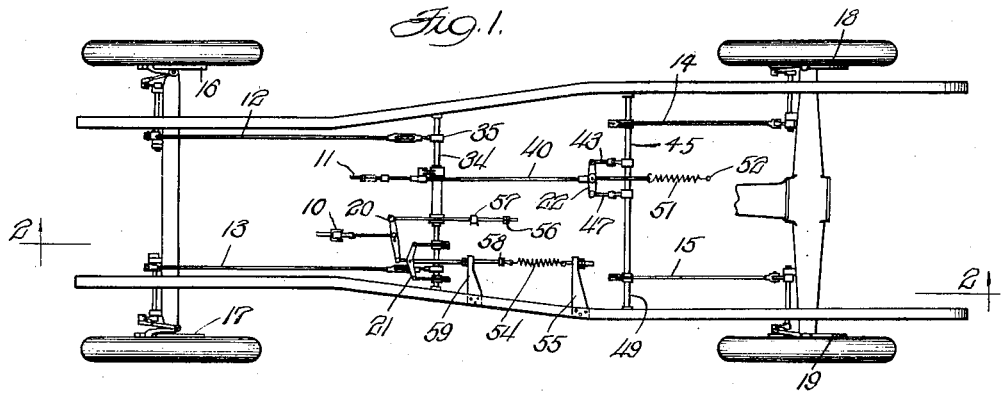
Figure 1 is a somewhat diagrammatic view showing an automobile chassis with brakes for all four wheels and suitable means for actuating the brakes.
Figure 2:
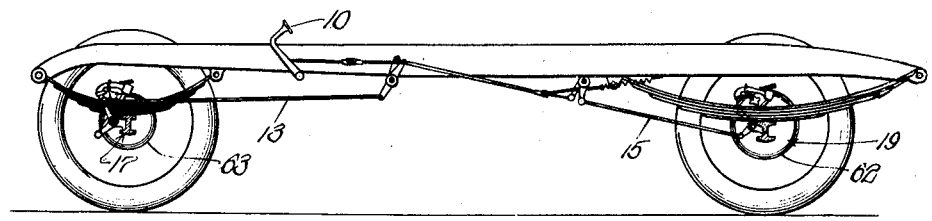
Fig. 2 is a side elevation of the construction shown in Fig. 1.

Referring to Figs. 1, 2 and 3, it will be noted that the actuating devices shown comprises the foot pedal 10 and the manually operated emergency brake lever 11 and that the pedal and lever act through suitable transmission on four horizontally extending reach rods 12, 13, 14 and 15, which extend adjacent the brake mechanisms 16, 17, 18 and 19 for the four wheels.

The foot pedal 10 acts through suitable equalizing transmission on all four of the reach rods, while the emergency brake lever 11 acts only on the rear reach rods 14 and 15.

Referring first to the connections between the foot pedal and the four reach rods, these comprise a major equalizing lever 20, a minor equalizing lever 21 for the front reach rods and a minor equalizing lever 22 for the rear reach rods. The longer end of the major equalizing lever 20 is connected with the triangular minor equalizing lever 21 by means of a link 23 which is extended rearwardly for a purpose hereinafter described. One end of the triangular minor equalizing lever 21 is connected with the reach rod 13 by means of a link 24 pivotally connected at 25 to the triangular equalizing lever, a rock arm 26 pivotally connected at 27 to the link 24, a rock shaft 28 on which the rock arm 26 is mounted and a rock arm 29 mounted on the rock shaft 28 and pivotally connected at 30 to the reach rod 13. A turnbuckle 31 may be provided for adjustment purposes.

The other end of the triangular equalizing lever is connected with the other front reach rod 12 by means of a link 32 pivotally connected to the equalizing lever, a rock arm 33 pivotally connected to the link 32, a rock shaft 34 on which the rock arm 33 is mounted and a rock arm 35 secured to the rock shaft 34 and pivotally connected to the reach rod 12. This reach rod also may be provided with an adjusting turnbuckle.

The shorter arm of the major equalizing lever 20 is connected with the rear minor equalizing lever 22 by means of a link 36 pivotally connected with the shorter arm of the major equalizing lever, a rock arm 37 pivotally connected with the link 36, a rock sleeve 38 pivoted on the rock shaft 34, a rock arm 39 mounted on the rock sleeve 38 and a link 40 pivotally connected at 41 to the rock arm 39 and pivotally connected at 42 with the rear minor equalizing lever 22.

One end of the rear equalizing lever 22 is connected with the reach rod 14 through a link 43 pivotally connected with the rear equalizing lever, a rock arm 44 pivotally connected with the link 43, a rock shaft 45 on which the rock arm 44 is mounted, and a rock arm 46 mounted on the rock shaft 45 and pivotally connected to the reach rod 14. The other end of the rear equalizing lever is similarly connected with the other rear reach rod 15 by means of a link 47, rock arm 48, rock shaft 49, and rock arm 50:

A suitably designed tension spring 51 is provided for releasing the rear brakes, this spring having one end fixedly secured at 52 and its other secured to the central point of the rear equalizing lever at 53.

A suitably designed spring 54 is provided also for releasing the front brakes, this spring being secured at one end to a fixed support 55 and at its other end secured to the rearward extension previously referred to of the link 23.

As it may be desirable to apply the rear brakes before the front brakes, I may make the spring 51 for the rear brakes somewhat weaker than the spring 54 for the front brakes, and this, combined with the fact that the shorter arm of the main equalizing lever is connected with the rear brakes, insures that the rear brakes will be applied first, since not only is a greater force applied, but a lesser spring resistance is provided.

In order to prevent failure of the brakes at one end from causing failure of the brakes at the other end, I provide suitable movement limiting stops. For preventing failure of the rear brakes from causing failure of the front brakes, I provide the rearward extension of the link 36 with an adjustable stop nut 56 which cooperates with a fixed abutment sleeve 57 in which the link 36 slides. In case any part of the connections between the rear brakes and the rock arm 37 should break or fail, the stop nut 56 would come up against the abutment sleeve 57 and hold the link 36 against further movement so that movement of the foot pedal 10 would still cause application of the front brakes.

In order to prevent failure of the front brakes from causing failure of the rear brakes, I provide the rearward extension of the link 23 with an adjustalbe stop nut 58, which cooperates with a fixed abutment sleeve 59, in which the link 23 slides.

In case any part of the connection between the front brakes and the front minor equalizing lever 21 should break or fail, the stop nut 58 would come up against the abutment sleeve 59, and prevent further movement of the link 23 so that the rear brakes could still be applied by movement of the foot pedal 10.

In order to prevent excessive releasing movement of either the front brakes or the rear brakes under the action of releasing springs 51 and 54 I provide suitable adjustable stop nuts 60 and 61, on the links 36 and 23 which cooperate with the abutment sleeves 57 and 59 hereinbefore referred to. If it were not for these stop devices for limiting the releasing movement of the springs, one or the other of the springs 51 or 54 might cause an excessive releasing movement which would have an undesirable effect on one or the other of the sets of brakes. Thus, the stop nut 60 cooperating with the releasing spring 51 for the rear brakes will prevent this spring from causing too great a movement of the short end of the equalizing lever, which excessive movement might make it impossible to sufficiently relieve the front brakes. Similarly, the stop nut 61 cooperating with the releasing spring 54 prevents excessive movement of the longer arm of the major equalizing lever 20, which excessive movement might interfere with the releasing of the rear brakes.

It may be desirable that a greater braking effect be applied to the rear wheels than to the front wheels and for this purpose I may make the brake drums 62, for the rear wheels of greater diameter than the brake drums 63 for the front wheels and this, combined with the fact that the shorter arm of the main equalizing lever acts on the rear brakes, insures that a substantially greater braking effect will be exerted on the rear wheels than on the front wheels.

In order that the braking effect on the outside wheel may be somewhat relieved in making a turn, I provide a construction which will slightly slacken up the reach rod for the outside wheel, and slightly tighten up on the reach rod for the inside wheel; and this, combined with the triangular minor equalizing lever, accomplishes the desired result. The slackening up of the reach rod on the outside wheel and the tightening up of the reach rod on the inside wheel throws the end of the triangular equalizing lever which is acting on the outside wheel slightly forward and this has the effect of increasing the effective lever arm of the triangular lever which acts on the outside wheel and decreasing the effective lever arm of the triangular lever acting on the inside brake wheel. As a consequence, a greater braking effect is exerted on the inside brake than on the outside brake. The construction by which the outside reach rod is slackened up and the inside reach rod tightened up is in the connections from the reach rods to the brake bands, which construction will now be described in detail.

This construction, shown in Figs. 4 and 5, comprises a lever 64, pivotally connected at 65 to one end of the brake band 66, a link 67 pivotally connected at 68 to the lever 64, and an adjustable nut 69 threaded on the link 67 and engaging the abutment 70 secured to the other end of the brake band, a link 71 connected by a ball and socket joint at 72 with the lever 64, and a bell-crank lever 73 having one arm connected by a sort of universal joint connection at 74 with the link 71, and having its other arm pivotally connected at 75 with the reach rod 13.

The construction by which one reach rod is slackened up and the other tightened up on turning is due essentially to the fact that the ball and socket connection at 72, while located adjacent the axis 76 of the steering knuckle is still somewhat offset rearwardly with respect to this axis, as shown in Fig. 5, so that in turning, the center 72 of this ball and socket joint will move in the arc of a small circle about the axis 76 of the steering knuckle.

By referring to Fig. 5, (assuming that the car is being turned so that the "outside" wheel is the one whose brake is connected with the reach rod 13) it will be seen that this movement of the ball and socket joint about the axis of the steering knuckle will cause a slackening up on the link 71 and, consequently, on the reach rod 13 for the outside brake, with the effect described above of somewhat relieving the braking effect on the outside brake.

As shown in Fig. 5, the link 71 extends downwardly and inwardly away from the brake drum and housing so that it does not interfere with the steering movement of the wheels. Also as shown in Fig. 5, the end of the lever 64 which is connected with the link 71 is bent inwardly so as to clear the brake drum and brake housing. In order to guide the lever 64 in its movements, a forked bracket 77 is provided which straddles the lever and holds it against lateral movement.

Referring to Fig. 4, it will be noted that the ball and socket joint 72 will move substantially vertically and will stay substantially the same distance from the axis of the steering knuckle so that the turning movement of the wheels in steering has only a slight effect on the braking operation, this slight effect as pointed out above simply being to relieve the braking effect on the outside wheel.

The bell-crank lever 73 may be pivotally mounted on a bearing bracket 78 which is readily attachable and detachable with respect to the front axle 79 by means of a clip 80 and bolts 81, so that this brake connection may be readily applied to cars already in use which it is desired to equip with front wheel brake construction.

Figure 6:
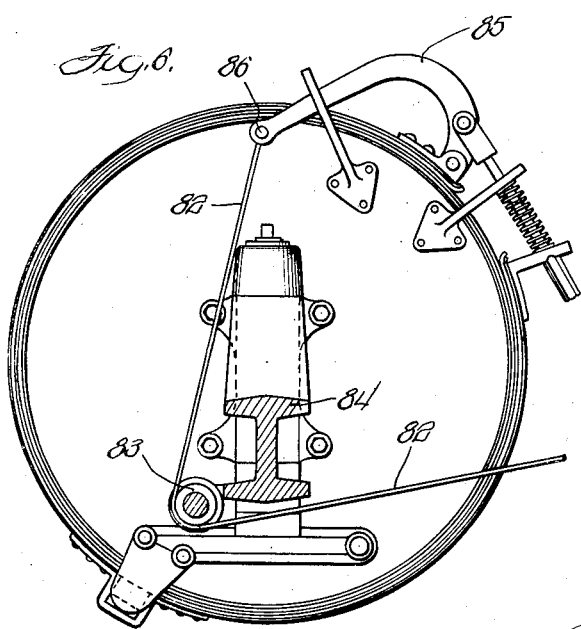
Fig. 6 is a side elevation showing a different form of brake connections.

In the construction shown in Fig. 6, a cable 82 and pulley 83 are substituted for the reach rod 13, bell-crank lever 73 and link 71 of Fig. 4. The pulley is mounted on the front axle 84 and the cable extends over this pulley and up to the lever 85, which corresponds to the lever 64 of Fig. 4. The connection 86 between the cable 82 and lever 85 is adjacent but slightly in the rear of the axis of the steering knuckle so that this construction also will have the effect of relieving the brake on the outside front wheel in turning if the cables are suitably connected with the triangular equalizing lever such as 21. The construction shown in Figure 6 is claimed specifically in my copending application No. 240,242, filed December 15, 1927.

Having thus described my invention, what I claim as new and desire to secure by Letters Patent of the United States is:

1. A steering wheel brake construction comprising an axle provided with a pair of steering knuckles, one at each end, a pair of steerable wheels mounted on said knuckles respectively to swing about the axis thereof, a pair of brakes for said wheels respectively and means for actuating said brakes, comprising an operating member common to both brakes, said actuating means having provisions whereby the relative braking effect on the two wheels is varied when the wheels are swung in steering, said actuating means comprising a triangular equalizing lever actuated by said common operating member.

2. A steering wheel brake construction comprising an axle provided with a pair of steering knuckles, one at each end, a pair of steerable wheels mounted on said knuckles respectively to swing about the axis thereof, a pair of brakes for said wheels respectively and means for actuating said brakes, comprising an operating member common to both brakes and shiftable to balance the pressures thereon, said actuating means having provisions whereby the relative braking effect on the two wheels is varied when the wheels are swung in steering, said actuating means comprising a lever mounted to swing with said wheel and having one end a short distance away from the axis of the steering knuckle and movable substantially parallel thereto.

3. A steering wheel brake construction comprising an axle provided with a pair of steering knuckles, one at each end, a pair of steerable wheels mounted on said knuckles respectively to swing about the axis thereof, a pair of brakes for said wheels respectively and means for actuating said brakes, comprising an operating member common to both brakes, said actuating means having provisions whereby the relative braking effect on the two wheels is varied when the wheels are swung in steering, said actuating means comprising a triangular equalizing lever actuated by said common operating member and a lever mounted to swing with said wheel and having one end a short distance away from the axis of the steering knuckle and movable substantially parallel thereto.

4. A vehicle having, in combination, a pair of steerable wheels having brakes, and brake-applying means acting on both of said brakes and balancing the brake-applying pressures as between the two brakes and including means not swinging with the wheels and operated by the steering swinging movement of the wheels to differentiate the balanced pressures as between the two brakes.

5. A vehicle having, in combination, a pair of steerable wheels having brakes, and brake-applying means acting on both of said brakes and balancing the brake-applying pressures as between the two brakes and including means not swinging with the wheels and operated by the steering swinging movement of the wheels to differentiate the balanced pressures as between the two brakes, together with parts swinging with the wheels when they are turned in steering and arranged to operate said differentiating means.

6. A vehicle having, in combination, a pair of steerable wheels having brakes, and brake-applying connections including an equalizer bar connected at opposite ends to the two brakes, and also including means operated by swinging the wheels in steering to vary the effective lengths of the two ends of the equalizer bar to differentiate the pressures on the two brakes.

7. A vehicle having, in combination, a pair of steerable wheels having brakes, and brake-applying connections including an equalizer bar connected at opposite ends to the two brakes, and also including parts swinging with the wheels in steering and operated by such swinging to vary the effective lengths of the two ends of the equalizer bar to differentiate the pressures on the two brakes.

8. An automobile brake construction comprising brakes for all four wheels, an operating member common to all four brakes, and transmission from said common operating member to all four of said brakes comprising a main equalizing lever having a link connecting one end with the rear brakes and a link connecting its other end with the front brakes and having a link connecting its intermediate portion with said operating member spring means for releasing said brakes, and means for limiting said releasing movement including stops carried by said links.

9. An automobile brake construction comprising brakes for all four wheels, an operating member common to all four brakes, and transmission from said common operating member to all four of said brakes comprising a main equalizing lever having one end connected with the rear brakes and its other end connected with the front brakes and having its intermediate portion connected with said operating member spring means for releasing said brakes, and means for limiting said releasing movement, comprising stop means for limiting the movement of the ends of said equalizing lever.

10. An automobile brake construction comprising front and rear pairs of wheels having brakes, an operating member common to all four brakes, and fully-equalized transmission means from said member to all four brakes arranged to vary the pressure on the two front brakes when the front wheels are turned in steering without interfering with the balancing of the forces on the two front brakes.

11. An automobile brake construction comprising front and rear pairs of wheels having brakes, an operating member common to all four brakes, and fully-equalized transmission means from said member to all four brakes including a main equalizing device connected to the operating member and two minor equalizing devices connected to opposite sides of the main equalizing device and connected respectively to the front and rear brakes and arranged to vary the pressure on the two front brakes when the front wheels are turned in steering.

In witness whereof, I have hereunto subscribed my name.

A. Y. DODGE.